May 24, 1949.　　　C. C. GRIFFIN　　　2,471,152
STACK CARRIER
Filed Nov. 3, 1947　　　3 Sheets-Sheet 1

Inventor
CLYDE C. GRIFFIN
By
Attorney

May 24, 1949.　　　　C. C. GRIFFIN　　　　2,471,152
STACK CARRIER
Filed Nov. 3, 1947　　　　3 Sheets-Sheet 2

Inventor
CLYDE C. GRIFFIN

Attorney

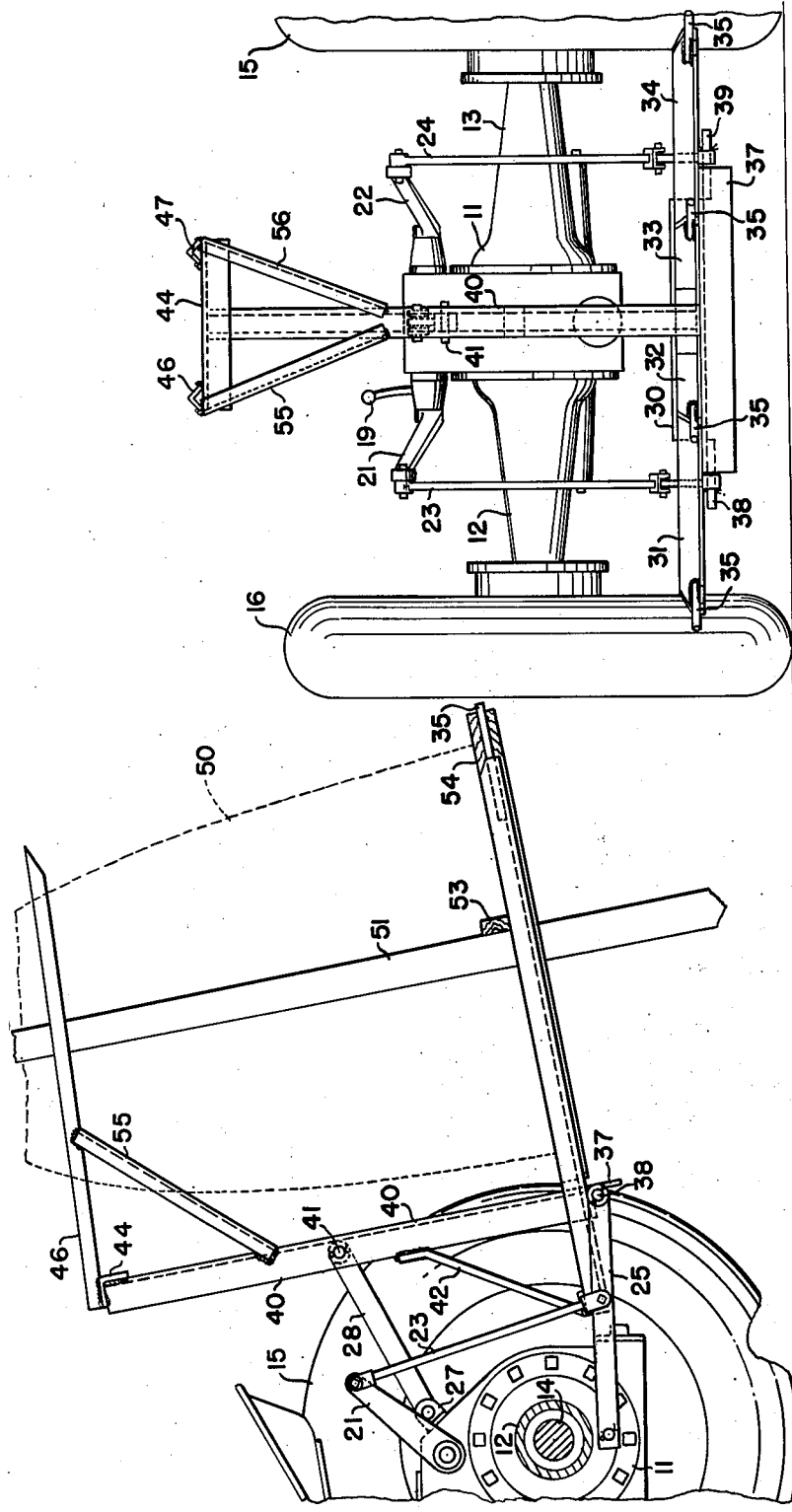

Patented May 24, 1949

2,471,152

UNITED STATES PATENT OFFICE 2,471,152

STACK CARRIER

Clyde C. Griffin, Branford, Fla.

Application November 3, 1947, Serial No. 783,821

2 Claims. (Cl. 214—131)

This invention relates to apparatus adapted to be secured on the rear of a tractor for insertion beneath and for raising small stacks of vegetation such as peanuts, hay and the like and transporting these to another place where they can be released and dumped onto the ground.

In the harvesting of peanuts, it is well known that the peanut plants along with the peanut pods on the roots thereof are pulled out of the ground and stacked in small stacks. It is necessary to hold these peanut vines off the ground during the drying out operation and therefore small stack poles are provided having cross pieces secured to near the lower end thereof and the vines are stacked on these cross pieces and around the poles so the cross pieces will hold them slightly elevated from the ground and prevent moisture from destroying the lower portion of the stack.

It is an object of this invention to provide a mechanism adapted to be pivotally secured to the rear end of a tractor and also pivotally secured to the hydraulic lift arms of the tractor and whereby the mechanism can be lowered and a plurality of spaced prongs can be inserted beneath the cross pieces holding the vegetation around the stack poles by backing the tractor toward the stack and then when the prongs have been inserted beneath the cross pieces, the hydraulic mechanism can be operated to raise the stack along with the stack pole, if one should be provided, and then the stack or shock can be transported to the point of disposal such as a threshing machine located in a field for threshing or picking the peanuts from the peanut vines or plants.

Some of the objects of the invention having been stated, other objects will appear as the description proceeds when taken in connection with the accompanying drawings, in which Figure 1 is a side elevation of the rear end of the tractor with the nearest wheel of the tractor broken away and showing the invention in one position;

Figure 3 is a rear elevation of the structure shown in Figure 2;

Figure 4 is an elevation similar to Figure 1 but showing the mechanism in elevated or transport position.

Figure 1:
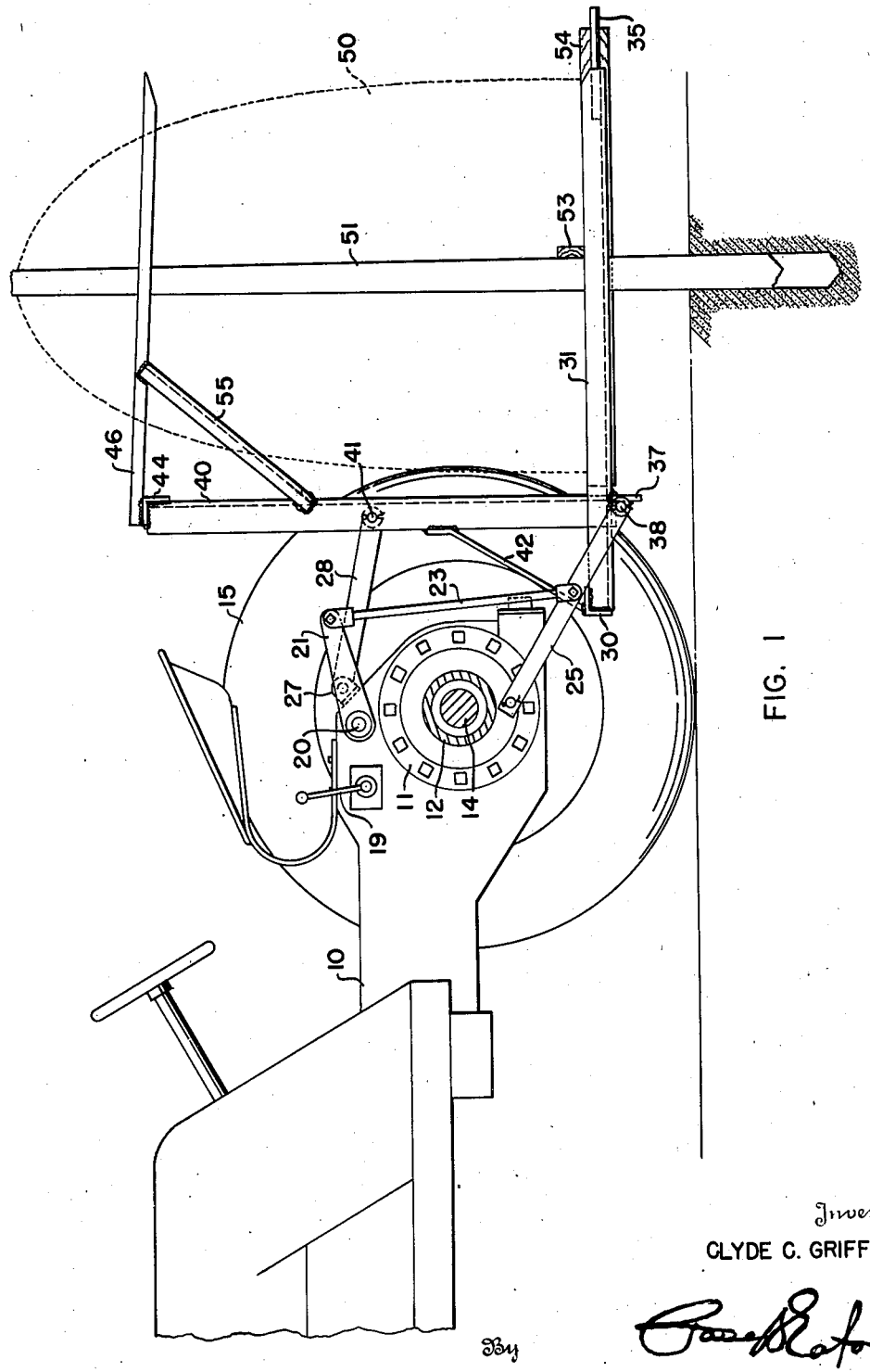
Figure 2:
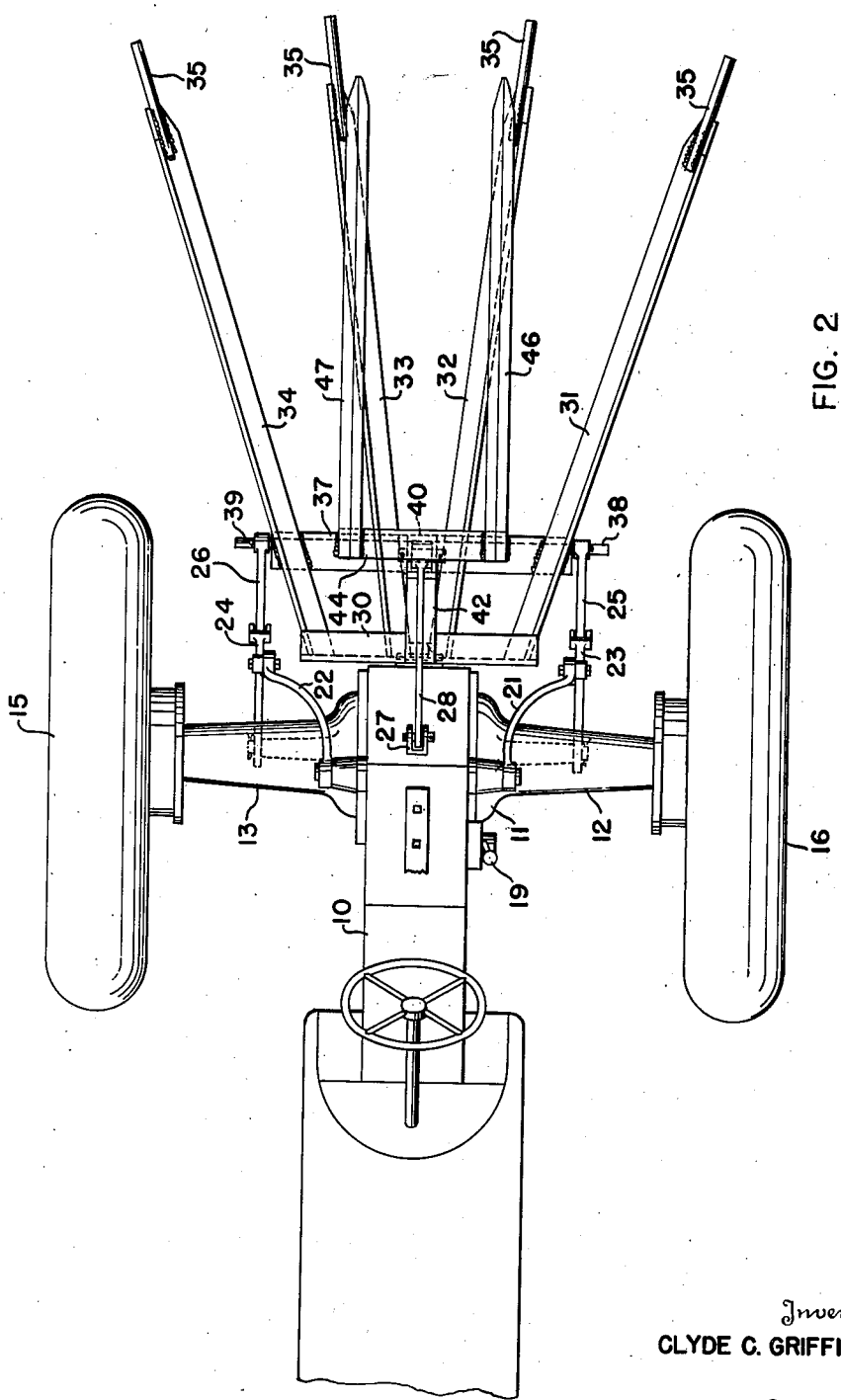
Figure 2 is a top plan view of Figure 1 and omitting the stack pole and cross pieces.

Referring more specifically to the drawings, the numeral 10 indicates a portion of the frame of a tractor which has a differential housing 11 at the rear end thereof from which project axle housings 12 and 13 and within which are axles 14.

The exterior ends of the axles are secured to the rear wheels 15 and 16. The tractor is equipped with a conventional hydraulically operated shaft 20 having arms 21 and 22 secured thereto on the outer ends of which are pivoted links 23 and 24. The hydraulically operated shaft 20 is controlled by a control lever 19 to raise and lower the arms 21 and 22. To the lower portion of the transmission housing 11 are pivoted one end of links 25 and 26 and the transmission housing has a projection 27 to which is pivoted a link 28.

It is with these links and arms that I support a suitable mechanism which comprises an angle iron 30 having a plurality of diverging angle bars 31 and 32, 33 and 34, secured thereto in the free ends of which are welded short spikes or shafts 35. Welded to the lower sides of these angle bars 31 to 34 inclusive is an angle bar 37 which has stub shafts 38 and 39 welded at each end thereof to which are pivotally connected the links 25 and 26.

Welded at its lower end to the angle bar 37 is an upright channel bar 40 which has pivoted as at 41 the rear end of link 28, the channel bar 40 being reinforced by a strut 42 being welded to the front surface thereof and also being welded to the angle bar 30. To the upper end of channel bar 40 is welded an angle bar 44 and to the top surface of angle bar 44 is welded the front end of each of a pair of inverted angle bars 46 and 47 which project rearwardly and substantially parallel to the lower angle bars 31 to 34 inclusive and are pointed at their rear ends.

The angle bars 46 and 47 are further reinforced by angle bars 55 and 56 which are welded to the angle bar 44 at one end and to the upright channel bar 40 at the other end.

The upper prongs or angle bars 46 and 47 being pointed at their rear ends are adapted to penetrate the upper portion of the hay stack and to hold it not only against lateral movement but to prevent its tilting backwardly while being transported from place to place.

The stack of peanut vines or other vegetation is indicated at dotted lines as reference character 50 and is attached around a small stack pole 51 which is suitably imbedded in the ground and this stack pole usually has some cross bars 53 and 54 secured thereto and the vegetation 50 is attached onto the top of these cross bars to hold it off the ground.

Method of Operation

With the apparatus in a slightly lower position than that shown in Figure 1, the tractor is backed so that the bars 31 to 34 will be disposed very close to the ground and will pass backwardly beneath the cross bars 53 and 54 and when in the fully backed up position, the lever 19 is manipulated to raise the mechanism upwardly and in Figure 1 it has been raised upwardly a slight amount and this is continued until it reaches approximately the position shown in Figure 4 where the parts are in transport position. In this position the tractor is driven forwardly to the point of discharge of the stack of vegetation, at which time the hydraulic mechanism will be operated to lower the prongs 31 to 34 until the vegetation and the stack pole rest upon the ground and then the tractor can be moved forwardly from beneath the cross pieces 53 and 54 from beneath the stack of vegetation 50 and it is then ready for threshing or for further stacking or for further operations.

In the drawings and specification there has been set forth a preferred embodiment of the invention and although specific terms are employed, they are used in a generic and descriptive sense only and not for purposes of limitation, the scope of the invention being defined in the claims.

I claim:
1. Means for transporting a stack of hay or other vegetation from one point to another comprising a hay carrying frame pivotally secured to the rear end of a tractor, said tractor having a hydraulic lift mechanism, said frame comprising a plurality of substantially parallel and rearwardly extending and diverging bars, a pair of angle bars secured in spaced relation to each other near the front end of the parallel bars, and an upright bar centrally disposed and secured at its lower end to one of said bars secured in transverse relation to the parallel bars, a transverse bar secured to the upper end of the upright bar and having a pair of spaced pointed angle members secured at one end thereto and extending rearwardly, a pair of links secured to the outer ends of one of the transverse bars and having their other ends secured to the frame of the tractor, said tractor having a pair of hydraulically operated lift arms, a pair of links connecting the free ends of the hydraulically operated lift arms to an intermediate portion of the two links connecting the transverse bar of the frame to the frame of the tractor, a connecting bar connecting an intermidate portion of the upright bar at one end and to the tractor frame at its other end, said parallel bars being adapted to be inserted beneath a stack of vegetation upon the tractor being backed toward the stack and whereby the two parallel bars with pointed rear ends will impale the upper portion of the stack and upon manipulation of the hydraulic lift mechanism the entire frame along with the stack of vegetation will be raised upwardly off the ground to transport it from one place to another.

2. Apparatus for lifting and carrying stacks of vegetation comprising a frame adapted to be secured to a tractor having a pair of hydraulic lift arms, the frame being disposed at the rear of the tractor and comprising a transverse bar, a plurality of rearwardly extending diverging bars disposed in a horizontal plane and having their front ends secured to the transverse bar, a second transverse bar secured to an intermediate portion of the diverging bars, an upright bar secured to a medial portion of the second transverse bar and a third transverse bar secured to the top of the upright bar and being of less length than the other two transverse bars, a pair of spaced, rearwardly extending parallel prongs having their front ends rigidly secured to the third transverse bar, a pair of lower links pivotally secured at one end to the tractor and pivotally secured at their other ends to the ends of the second transverse bar, an upper link pivotally secured at its rear end to the upright bar at a point substantially above the plane of the diverging bars and at its forward end to the tractor frame, a pair of links connecting the hydraulic arms with a medial portion of the first mentioned pair of links and whereby upon manipulation of the hydraulic lift arms the frame can be lifted vertically after the lower bars thereof have been inserted beneath a stack of vegetation and the prongs have impaled the hay stack to thereby transport the stack from one place to another.

CLYDE C. GRIFFIN.

REFERENCES CITED

The following references are of record in the file of this patent:

UNITED STATES PATENTS

| Number | Name | Date |
|---|---|---|
| 2,311,671 | Larsen | Feb. 23, 1943 |
| 2,379,797 | Gilbert | July 3, 1945 |
| 2,398,585 | Hayward | Apr. 16, 1946 |
| 2,412,643 | Maki | Dec. 17, 1946 |
| 2,427,575 | Sedore | Sept. 16, 1947 |